US007495798B2

(12) United States Patent
Kakutani

(10) Patent No.: US 7,495,798 B2
(45) Date of Patent: Feb. 24, 2009

(54) EJECTION CONTROL OF QUALITY-ENHANCING INK

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 722 days.

(21) Appl. No.: 10/927,625

(22) Filed: Aug. 25, 2004

(65) Prior Publication Data

US 2005/0099444 A1 May 12, 2005

(30) Foreign Application Priority Data

Aug. 26, 2003 (JP) ............................ 2003-300722

(51) Int. Cl.
*G06K 15/10* (2006.01)

(52) U.S. Cl. ...................... 358/1.9; 358/3.01; 358/3.02; 358/3.03; 358/3.06; 358/3.1; 358/3.13; 358/534; 358/536

(58) Field of Classification Search .................... 347/6, 347/15; 358/1.9, 3.02, 3.04, 3.12, 504, 518, 358/3.06, 534, 536; 382/167, 252
See application file for complete search history.

(56) References Cited

U.S. PATENT DOCUMENTS 5,031,050 A * 7/1991 Chan ......................... 358/3.16
5,621,543 A * 4/1997 Oomoto ....................... 382/243
5,721,625 A * 2/1998 Furusawa et al. .......... 358/3.14
5,933,164 A * 8/1999 Sato et al. ...................... 347/43
6,118,935 A * 9/2000 Samworth ................... 358/1.9
6,158,834 A * 12/2000 Kato et al. ..................... 347/9
6,441,923 B1 * 8/2002 Balasubramanian et al. ......................... 358/3.23
6,445,465 B1 * 9/2002 Samworth ................... 358/1.9
6,731,405 B2 * 5/2004 Samworth .................. 358/3.06
6,741,735 B2 * 5/2004 De La Torre ................ 382/167
6,863,374 B2 * 3/2005 Yamazaki et al. ............. 347/43
7,054,038 B1 * 5/2006 Ostromoukhov et al. ... 358/3.13
7,099,049 B2 * 8/2006 Yu et al. .................... 358/3.26

FOREIGN PATENT DOCUMENTS

JP 08-060559 3/1996
JP 2002-144551 5/2002

OTHER PUBLICATIONS

Abstract of Japanese Patent Publication No. 08-060559 Pub. Date: Mar. 5, 1996, Patent Abstracts of Japan.
Abstract of Japanese Patent Publication No. 2002-144551, Pub. Date: May 21, 2002, Patent Abstracts of Japan.

* cited by examiner

*Primary Examiner*—King Y Poon
*Assistant Examiner*—Richard Z Zhu
(74) *Attorney, Agent, or Firm*—Martine Penilla & Gencarella, LLP

(57) ABSTRACT

A printing control method of generating print data to be supplied to a print unit capable of forming dots on a print medium by ejecting ink droplets of at least one type of colored ink containing a color material and a quality-enhancing ink for enhancing quality of a printed material. The printing control method comprises a tone-decreasing step which includes the step of generating transparent dot data by a process configured such that size of first processing-targeted pixels is larger than size of second processing-targeted pixels, the first processing-targeted pixels being targeted for processing in the transparent dot data generating process, the second processing-targeted pixels being targeted for processing in the colored dot data generating process.

8 Claims, 11 Drawing Sheets

First Embodiment

EJECTION CONTROL OF QUALITY-ENHANCING INK

BACKGROUND OF THE INVENTION

1. Field of the Invention

The present invention relates to printing technology for carrying out printing of images by means of ejecting ink onto a printing medium.

2. Description of the Related Art

In recent years, printers that eject ink from the nozzles of a print head have become widely used as output devices for computers. In printers of this kind, by using quality-enhancing ink in order to improve quality of printed material as taught, for example, in Unexamined Patent Application 2002-144551, the aim is to give high quality to printed output by enhancing coloration, water resistance, and light resistance, and by controlling gloss irregularities. Since quality-enhancing ink of this kind is substantially transparent, during generation of dot data representing transparent dot formation status on each pixels, there exists a strong need to shorten the time required by the data generation process, rather than for accuracy of data.

However, to date, there has yet to be considered an arrangement for a processing method devised with a view to shortening the time required by the dot data generation process for these transparent dots.

SUMMARY OF THE INVENTION

The object of the invention is thus to eliminate the drawbacks of the prior art technique and to provide a technique of shortening a total time required for a printing process with a quality-enhancing ink for improvement of the quality of a resulting print.

In order to attain the above objects of the present invention, there is provided a printing control method of generating print data to be supplied to a print unit to print. The print unit is capable of forming dots on a print medium by ejecting ink droplets of at least one type of colored ink containing a color material and a quality-enhancing ink for enhancing quality of a printed material. The printing control method comprises (a) a color conversion step of converting pixel values representing a color in each pixel of the image data into multi-tone data of each ink, the multi-tone data of each ink being for expressing the color with the at least one colored ink and the quality-enhancing ink available in the print unit, and (b) a tone-decreasing step of generating dot data representing a dot formation state of a colored dot formed with the at least one colored ink and a transparent dot formed with the quality-enhancing ink in each pixel, according to the multi-tone data of the each ink generated by the color conversion. The tone-decreasing step includes the step of generating transparent dot data by a process configured such that size of first processing-targeted pixels is larger than size of second processing-targeted pixels, the first processing-targeted pixels being targeted for processing in the transparent dot data generating process, the second processing-targeted pixels being targeted for processing in the colored dot data generating process.

In this aspect, transparent dot data is generated by a process whose content is designed such that size of first processing-targeted pixels targeted for processing during the transparent dot data generation process is larger than the size of second processing-targeted pixels targeted for processing during the colored dot data generation process, whereby the amount of data targeted in the transparent dot data generation process is less than the amount of data targeted in the colored dot data generation process. By so doing, transparent dot data can be generated in a shorter time, and the amount of memory used in generating transparent dot data can be reduced.

Here, "printed material" refers to material produced by ejecting the aforementioned colored ink and the aforementioned quality-enhancing ink onto a printing medium. "Quality-enhancing ink" refers broadly to ink intended for enhancing quality of printed material, namely, enhancing coloration, water resistance, and light resistance, and controlling gloss irregularities.

The present invention further provides an arrangement of an embodiment for carrying out color conversion such that the tone number of quality-enhancing ink is smaller than the tone number of colored ink; and an arrangement of an embodiment for generating transparent dot data using a tone-decreasing process method requiring a shorter time to execute than the tone-decreasing process method used in generating colored dot data.

The present invention may also be realized in various other forms, such as a printing device; a computer program for realizing the functions of such a method or device by means of a computer; a storage medium having such a computer program stored thereon; a data signal including such a computer program and embodied in a carrier wave; a computer program product, and so on.

DESCRIPTION OF THE PREFERRED EMBODIMENTS

A. Configuration of System

Figure 1:
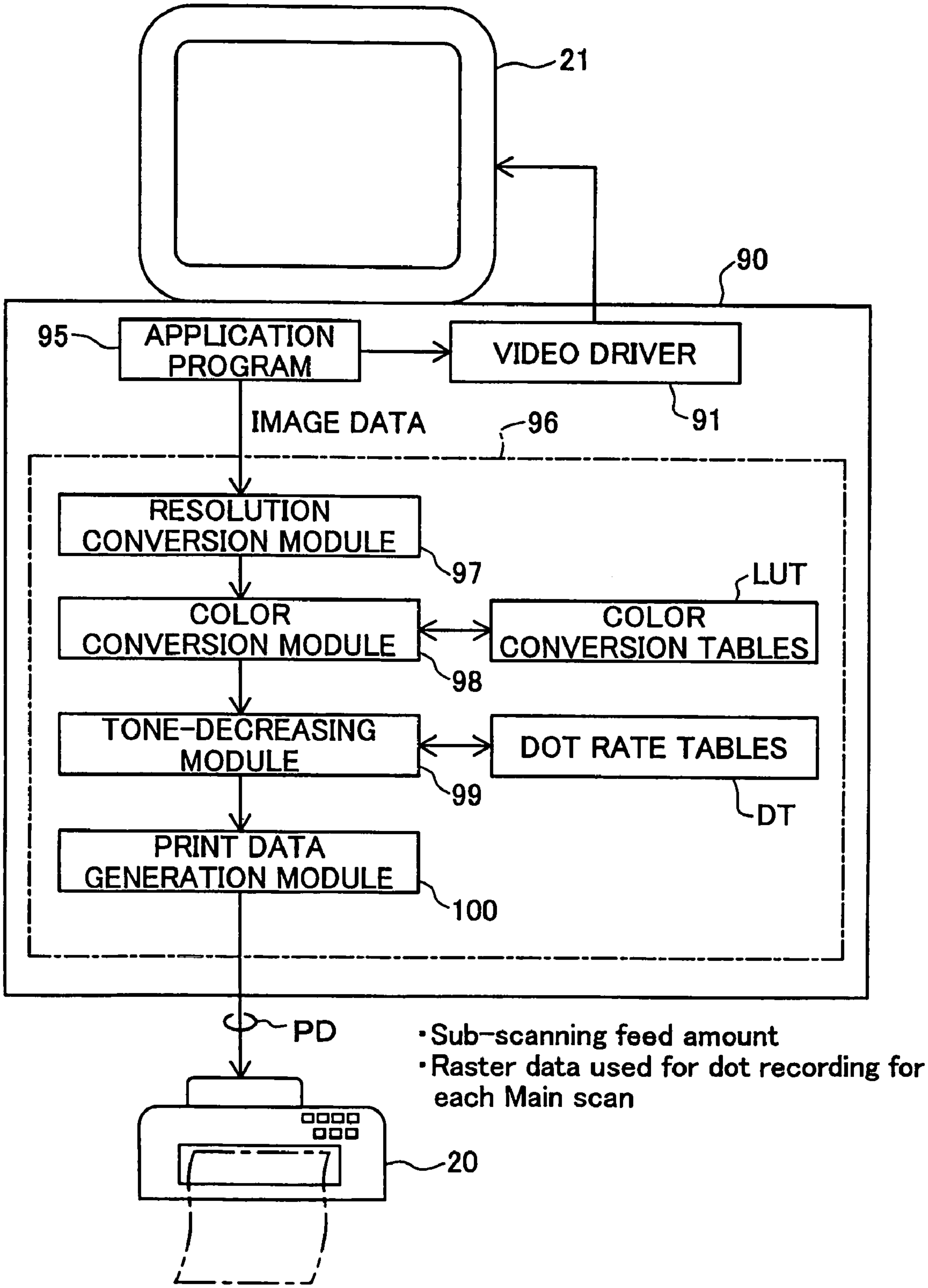
FIG. 1 is a block diagram showing the arrangement of a printing system as an embodiment of the invention.

FIG. 1 is a block diagram schematically illustrating the configuration of a printing system in one embodiment of the invention. This printing system includes a computer 90 functioning as a printing control apparatus and a color printer 20 functioning as a print unit. The combination of the color printer 20 with the computer 90 is regarded as a "printing apparatus" in the broad sense.

Application program 95 operates on computer 90 under a specific operating system. A video driver 91 and a printer driver 96 are incorporated in the operating system. The application program 95 outputs image data, which goes through a series of image processing in the printer driver 96 and is given as print data PD to the color printer 20. The application program 95 also outputs image data to display a processed image on a CRT 21 via the video driver 91.

The printer driver 96 includes a resolution conversion module 97, a color conversion module 98, a tone-decreasing module 99, a print data generation module 100, multiple color conversion tables LUT, and a dot rate table DT. The functions of these constituents will be discussed later.

The printer driver 96 is equivalent to a program functioning to generate the print data PD. The program of attaining the functions of the printer driver 96 is supplied in the form recorded in a computer readable recording medium. Typical examples of such computer readable recording medium include flexible disks, CD-ROMs, magneto-optic disks, IC cards, ROM cartridges, punched cards, prints with barcodes or other codes printed thereon, internal storage devices (memories like RAM and ROM) and external storage devices of the computer, and a diversity of other computer readable media.

Figure 2:
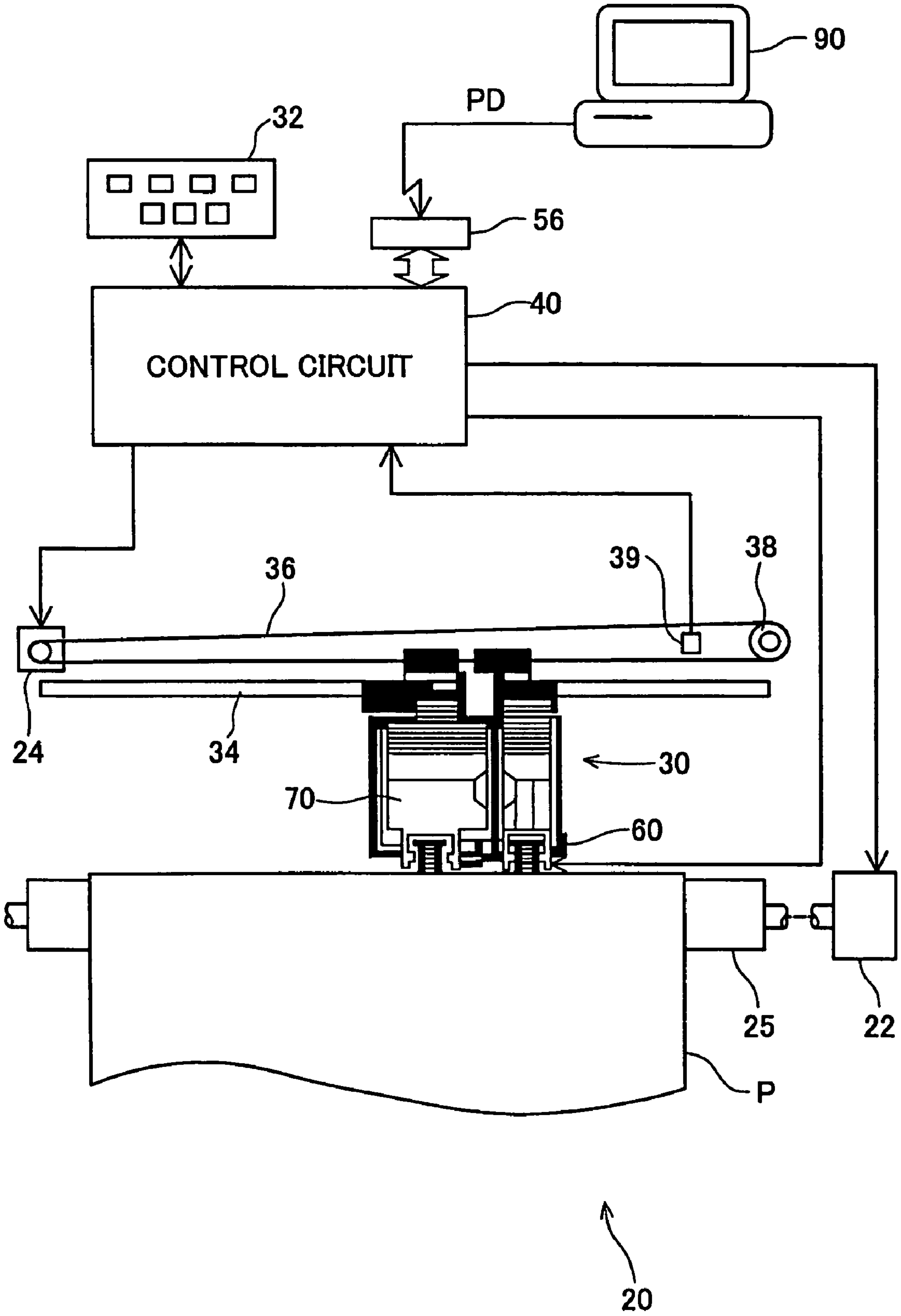
FIG. 2 is a simplified schematic diagram of color printer 20.

FIG. 2 schematically illustrates the structure of the color printer 20. The color printer 20 has a sub-scan drive unit that activates a paper feed motor 22 to feed a sheet of printing paper P in a sub-scanning direction, a main scan drive unit that activates a carriage motor 24 to move a carriage 30 back and forth in an axial direction of a paper feed roller 25 (in a main scanning direction), a head drive mechanism that drives a print head unit 60 (also called 'print head assembly') mounted on the carriage 30 to control ink ejection and dot formation, and a control circuit 40 that transmits signals to and from the paper feed motor 22, the carriage motor 24, the print head unit 60, and an operation panel 32. The control circuit 40 is connected to the computer 90 via a connector 56.

Figure 3:
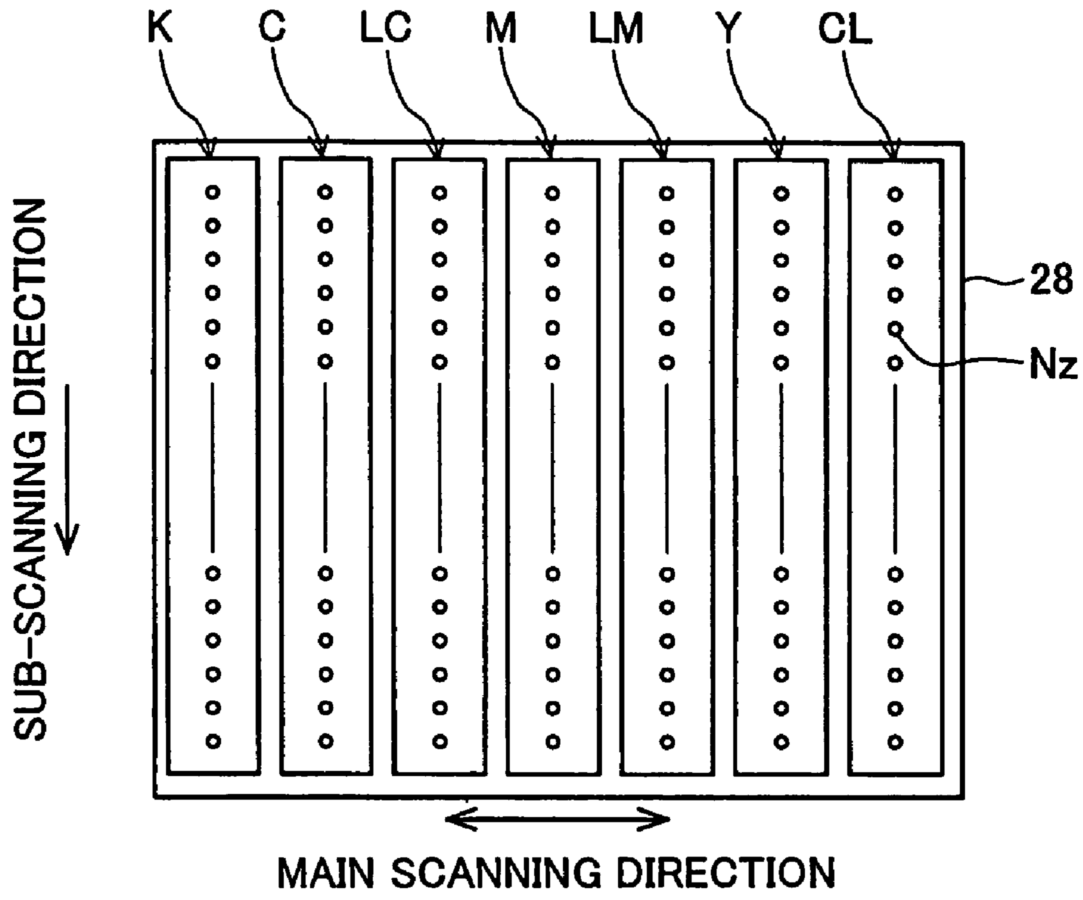
FIG. 3 is an illustration showing rows of nozzles Nz on the lower face of print head 28.

FIG. 3 shows an arrangement of nozzles Nz on the bottom face of the print head 28. Nozzle arrays for black ink K, cyan ink C, light cyan ink LC, magenta ink M, light magenta ink LM, yellow ink Y, and quality-enhancing ink CL are formed on the bottom face of the print head 28.

The available inks other than the quality-enhancing ink CL are not restricted to these six inks K, C, LC, M, LM, and Y but may be selected arbitrarily according to the desired picture quality of printed material. For example, the four inks K, C, M, and Y may be used, or only the black ink K may be used. Dark yellow ink having the lower lightness than the yellow ink Y, gray ink having the higher lightness than the black ink K, blue ink, red ink, and green ink may be used in some combinations. In the specification hereof, ink containing any of such color material is called 'colored ink'.

The quality-enhancing ink CL may be transparent and colorless ink having similar gloss to the other inks and enhancing the color development of the other inks. The quality-enhancing ink CL may be ink disclosed in Japanese Patent Laid-Open Gazette No. 8-60059. The quality-enhancing ink CL functions to reduce the variation in gloss and enhance the color development, thus improving the picture quality of the printed material. The quality-enhancing ink CL may otherwise be ink for enhancing the water resistance or the light resistance to improve the water resistance or the light resistance of printed material.

In the color printer 20 having the hardware structure discussed above, while the printing paper P is fed by the paper feed motor 22, the carriage 30 is moved back and forth by means of the carriage motor 24 and simultaneously piezoelectric elements on the print head 28 are actuated to eject ink droplets of the respective color inks and form ink dots of variable sizes (large, medium, small). This gives a multicolor, multi-tone image on the printing paper P.

B. Print Data Generating Process in the First Embodiment

Figure 4:
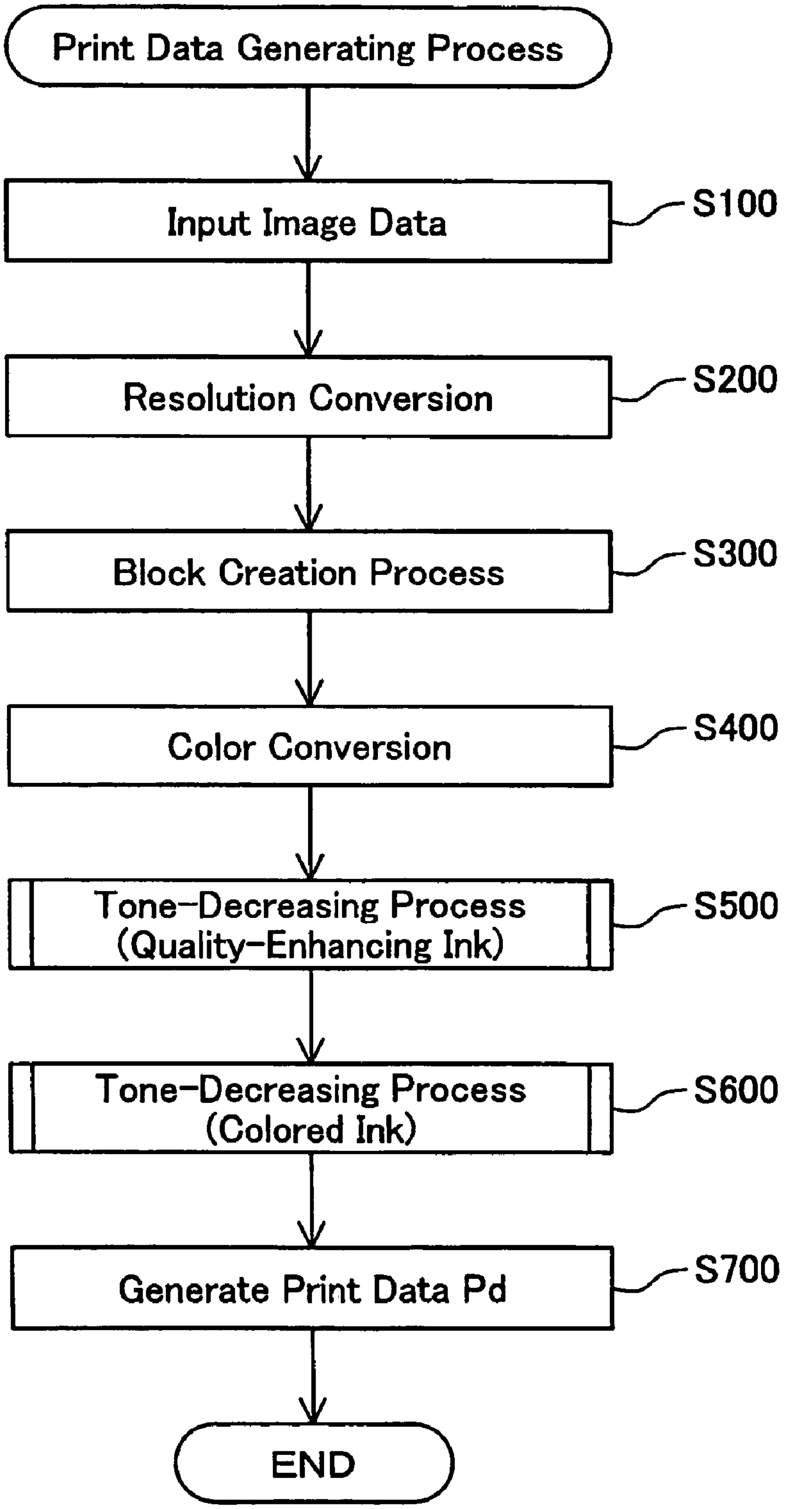
FIG. 4 is a flowchart showing the routine of the print data generating process in this embodiment of the invention.

FIG. 4 is a flowchart showing the routine of the print data generating process in this embodiment of the invention. The print data generating process is a process carried out by computer 90, in order to generate print data PD to be supplied to color printer 20.

Print data includes colored dot data and transparent dot data. "Colored dot data" is data representing formation status, in each print pixel, of colored dots formed with colored ink. "Transparent dot data" is data representing formation status, in each print pixel, of transparent dots formed with transparent ink. Print pixels will be described later.

In Step S100, printer driver 96 (FIG. 1) inputs print data from an application program 95. This input process is carried out in response to a print command made by application program 95. Here, print data consists of RGB data.

In Step S200, resolution conversion module 97 converts the resolution (i.e. number of pixels per unit of length) of the input RGB image data to the print resolution. Here, "print resolution" is equivalent to the pitch at which dots are formed in color printer 20. By so doing, there are also defined "print pixels" which are areas targeted for dot formation. In this embodiment, "print pixels" correspond to the "second processing-targeted pixels" recited in the claims.

Where print resolution is an integral multiple of RGB image data, it is preferable to carry out color conversion at the same time as resolution conversion. For example, where print resolution and RGB image data resolution are 2880 dpi and 360 dpi respectively, one pixel of RGB image data corresponds to 64 print pixels of multi-tone data. In such a case, a data area for 2880 dpi multi-tone data use will be established, and multi-tone data produced as a result of color conversion of one pixel of RGB image data will be stored in the 64 corresponding print pixels.

For colored inks, the process of generating colored dot data is carried out on a per-print pixel basis. For quality-enhancing ink, on the other hand, the process of generating transparent dot data is carried out on a per-pixel block basis, each block being equivalent to a set of a plurality of print pixels. By so doing, the amount of processing during transparent dot data can be reduced.

Figure 5:
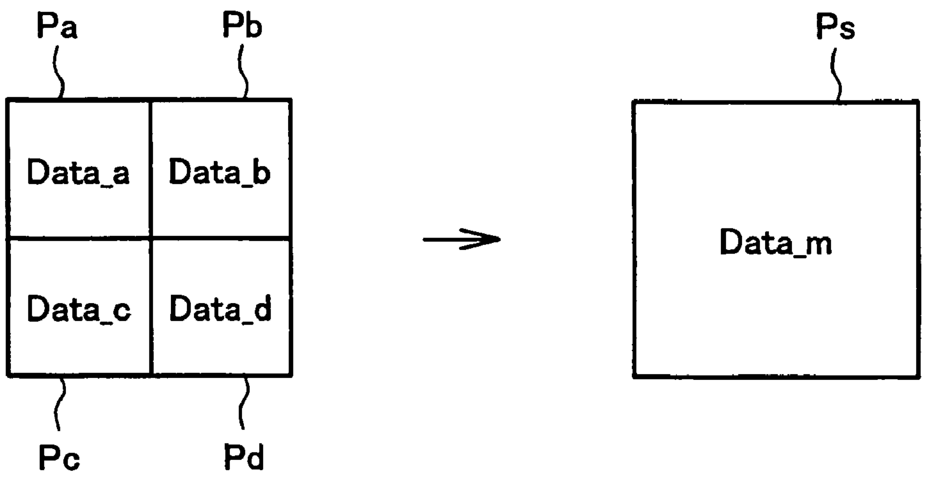
FIG. 5 is an illustration showing an example of a pixel block targeted for processing during generation of transparent dot data in this embodiment of the invention.

FIG. 5 is an illustration showing an example of a pixel block targeted for processing during generation of transparent dot data in this embodiment of the invention. In this example, a pixel block Ps is created by taking four print pixels Pa, Pb, Pc, Pd in a 2×2 arrangement. The four print pixels Pa, Pb, Pc, Pd have pixel values of Data_a, Data_b, Data_c, and Data_d respectively. Pixel block Ps has a pixel value Data_m. In this embodiment, Data_m is the average of the four pixel values Data_a, Data_b, Data_c, and Data_d. In this embodiment, "pixel blocks" correspond to the "first processing-targeted pixels" recited in the claims.

In Step S400, the RGB image data is converted to multi-tone data of the colored ink and quality-enhancing ink useable by color printer 20. The color conversion process is carried out on a per-print pixel basis for colored ink, and on a per-pixel block basis for quality-enhancing ink. The color conversion process is carried out while making reference to a color conversion table LUT.

Figure 6:
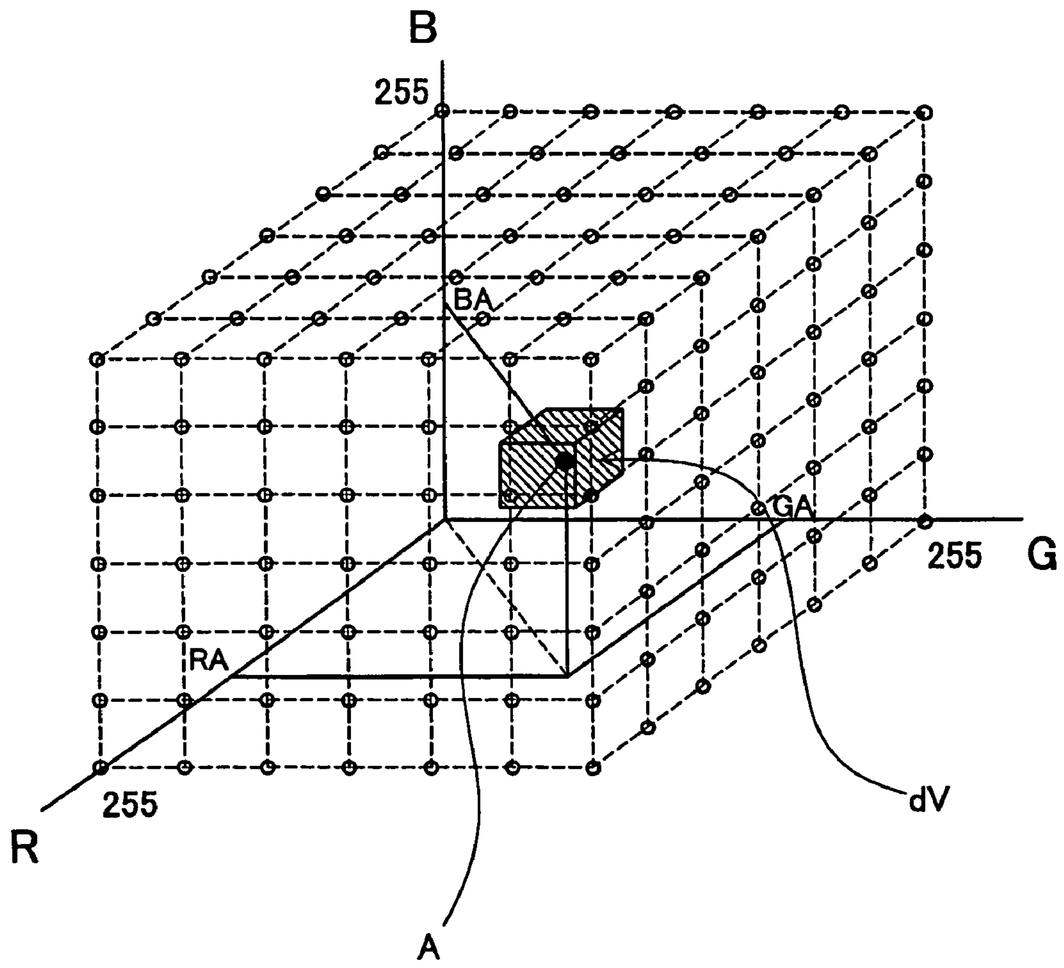
FIG. 6 is an illustration showing a color conversion table LUT used in the color conversion process in this embodiment of the invention.

FIG. 6 is an illustration showing a color conversion table LUT used in the color conversion process in this embodiment of the invention. In the color conversion table LUT, tone values of the RGB colors are plotted on three mutually orthogonal axes, with the space defined by the three axes being subdivided into a grid. At the subdivided grid points are stored tone values of inks for representing, with colored ink and quality-enhancing ink, the colors denoted by the RGB color tone values.

Color conversion module 98 performs color conversion while making reference to the color conversion table LUT. For example, where R, G and B tone values of image data are RA, GA, and BA, respectively, first, a search is performed for a cube dV that includes a point A represented by coordinates (RA, GA, and BA) on the color conversion table LUT. Cube dV is a cube having as vertices eight grid points selected so as to include point A.

Color conversion module 98 reads out the tone values for the colored inks (C, M, Y, K, LC, LM) and quality-enhancing ink CL stored at these eight grid points. By means of interpolating from tone values read out, the color conversion module 98 calculates tone values for the colored inks.

On the other hand, the color conversion module 98 designates read out tone value as quality-enhancing ink CL without performing interpolation. The reason for not performing interpolation when calculating quality-enhancing ink CL is in order to increase the processing speed. Quality-enhancing ink CL tone values are established on the basis of the relationship between colored ink ejection quantity and quality-enhancing ink ejection quantity.

Figure 7A:
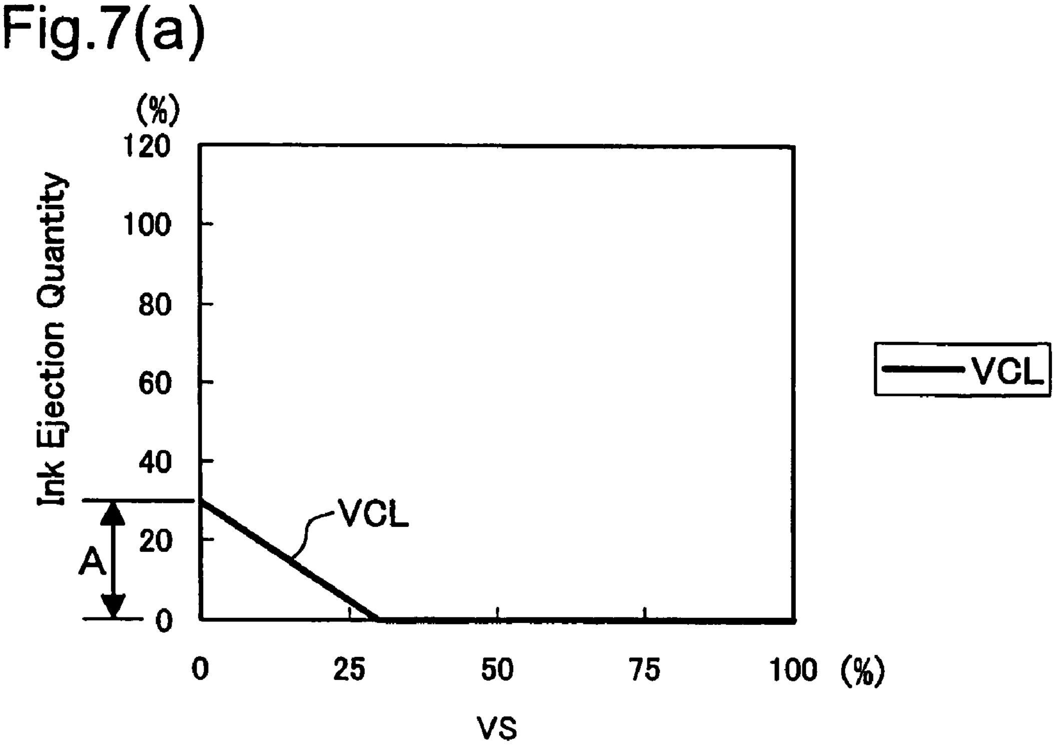
FIGS. 7(*a*), 7(*b*) are graphs showing an example of the relationship between colored ink ejection quantity and quality-enhancing ink ejection quantity.
Figure 7B:
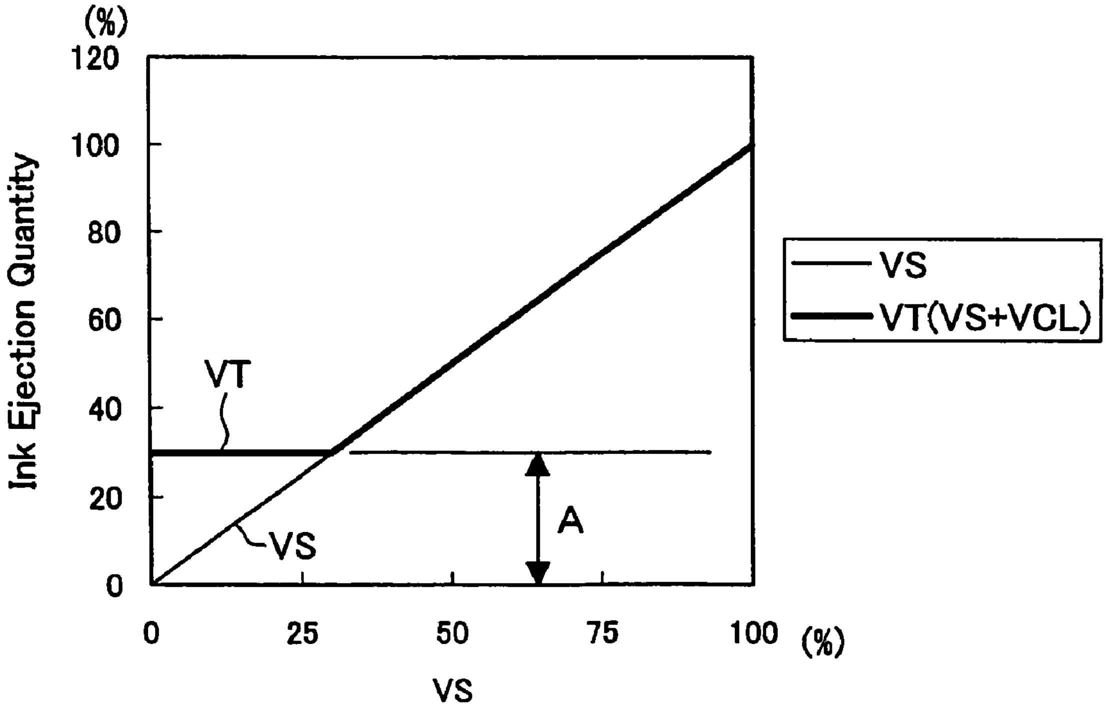

FIGS. 7(*a*), 7(*b*) are graphs showing an example of the relationship between colored ink ejection quantity and quality-enhancing ink ejection quantity. FIG. 7(*a*) shows the relationship between colored ink ejection quantity VS and quality-enhancing ink ejection quantity VCL. FIG. 7(*b*) shows the relationship between colored ink ejection quantity VS and the sum VT (=VS+VT) of ejection quantities of colored ink and quality-enhancing ink. The vertical axis is ejection quantity of ink indicated by the legend.

As will be understood from FIGS. 7(*a*), 7(*b*), where the printing medium is glossy paper, the ejection quantity of quality-enhancing ink is determined in such a way that large amounts of quality-enhancing ink are ejected onto blank areas onto which no colored ink has been ejected. This determination is made because, when printing onto a printing medium with relatively high gloss, there is a tendency for gloss to be higher in areas having greater quantities of colored ink ejected thereon, and thus by ejecting more quality-enhancing ink onto white pixels, irregularity of gloss can be controlled.

In Step S500, tone-decreasing module 99 performs a tone-decreasing process for the quality-enhancing ink. In this embodiment, the tone-decreasing process is a process that reduces the tone number of multi-tone data to the tone number reproducible on each print pixel by color printer 20, namely, two tones. In this embodiment, these two tones are represented as “dot off” and “dot on.”

While for colored ink, the tone number of multi-tone data is established at 256 tones, for quality-enhancing ink it is established at 16 tones. In this way, by making the tone number of quality-enhancing ink smaller than the tone number of colored ink, the amount of data of multi-tone data is reduced, whereby the amount of processing needed to generate quality-enhancing ink dot data is reduced. By so doing, there is greater quantization error in quality-enhancing ink ejection quantity due to the reduction in tone number for the quality-enhancing ink, but since the quality-enhancing ink is transparent, print quality is not degraded to an excessive extent.

Figure 8:
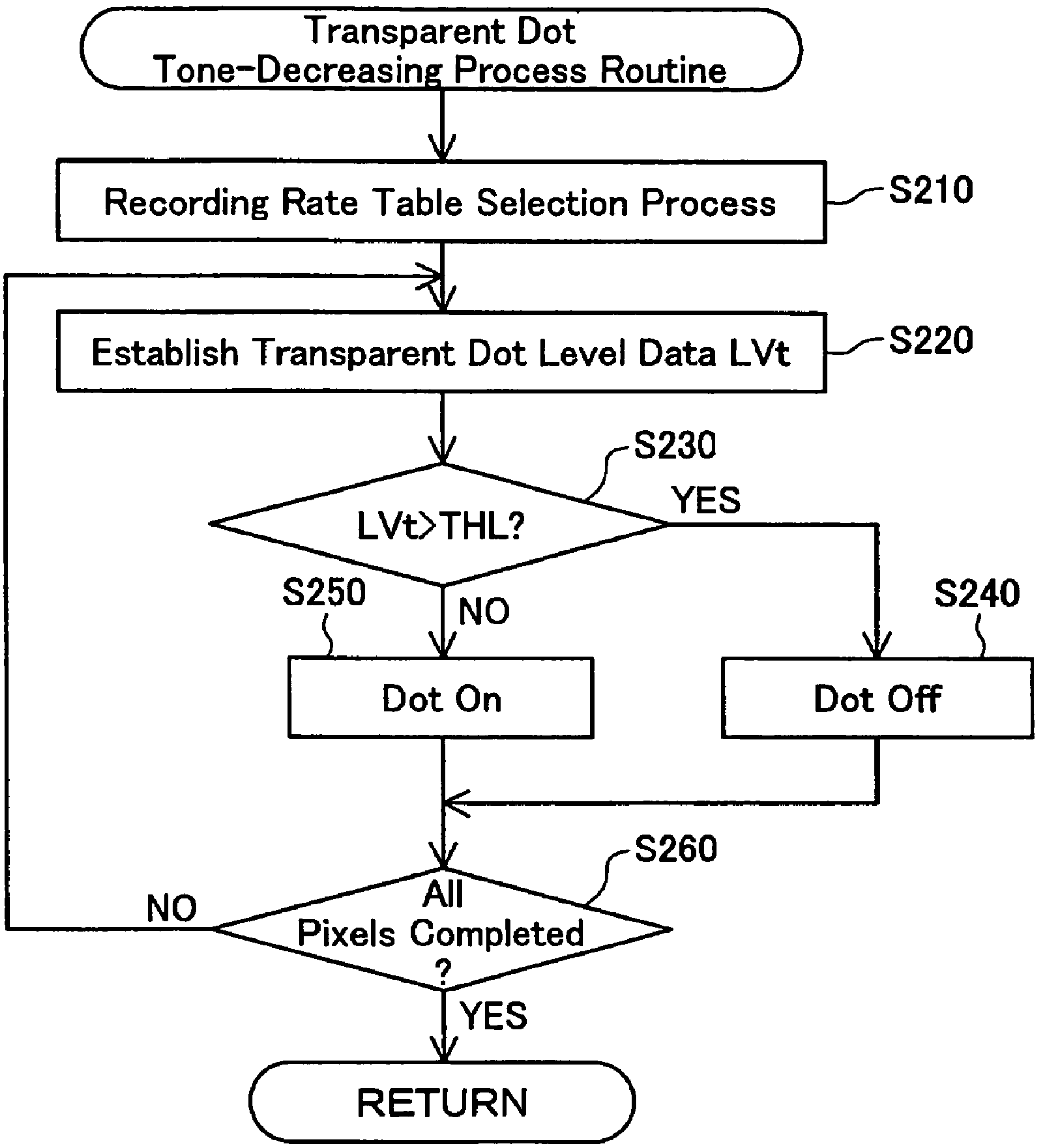
FIG. 8 is a flowchart showing the flow of the tone-decreasing process for multi-tone data of transparent ink in this embodiment of the invention.

FIG. 8 is a flowchart showing the flow of the tone-decreasing process for multi-tone data of transparent ink in this embodiment of the invention. This tone-decreasing process is carried out by a systematic dither process. The reason for carrying out the tone-decreasing process by means of a systematic dither process is to give priority to processing speed over print quality, since dispersion of transparent dots has no appreciable effect on print quality.

In Step S210, tone-decreasing module 99 selects the transparent dot recording rate table DTt from among the two recording rate tables included in dot recording rate table DT. Dot recording rate table DT (FIG. 1) includes a colored dot recording rate table DTc and transparent dot recording rate table DTt.

Figure 9A:
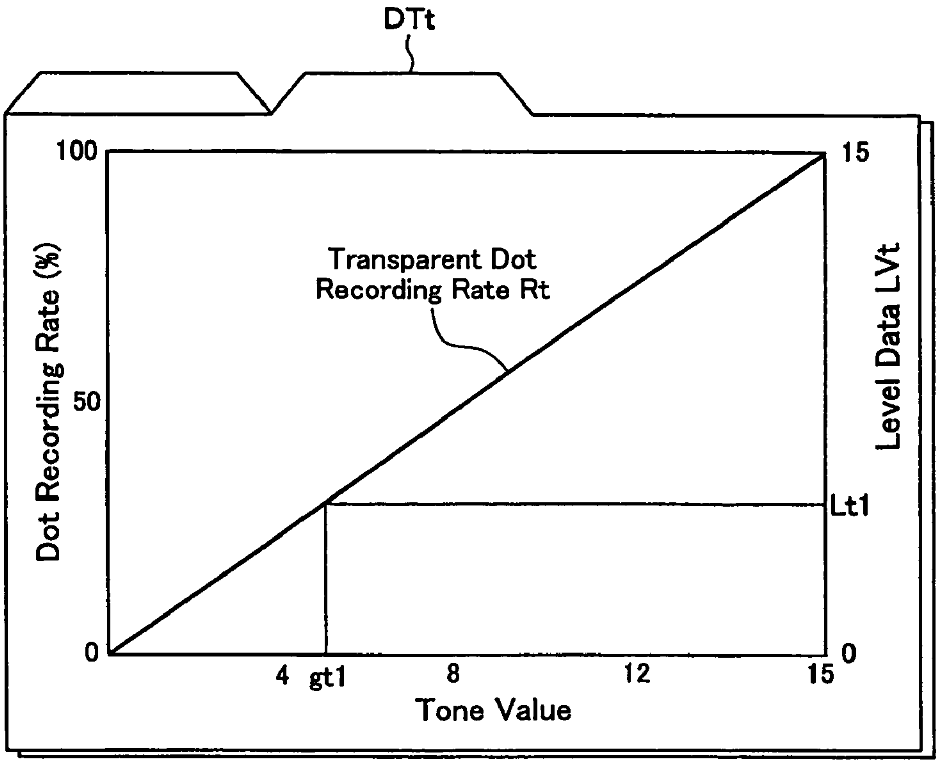
FIGS. 9(*a*), 9(*b*) are illustrations showing the transparent dot recording rate table DTt and colored dot recording rate table DTc in this embodiment of the invention.
Figure 9B:
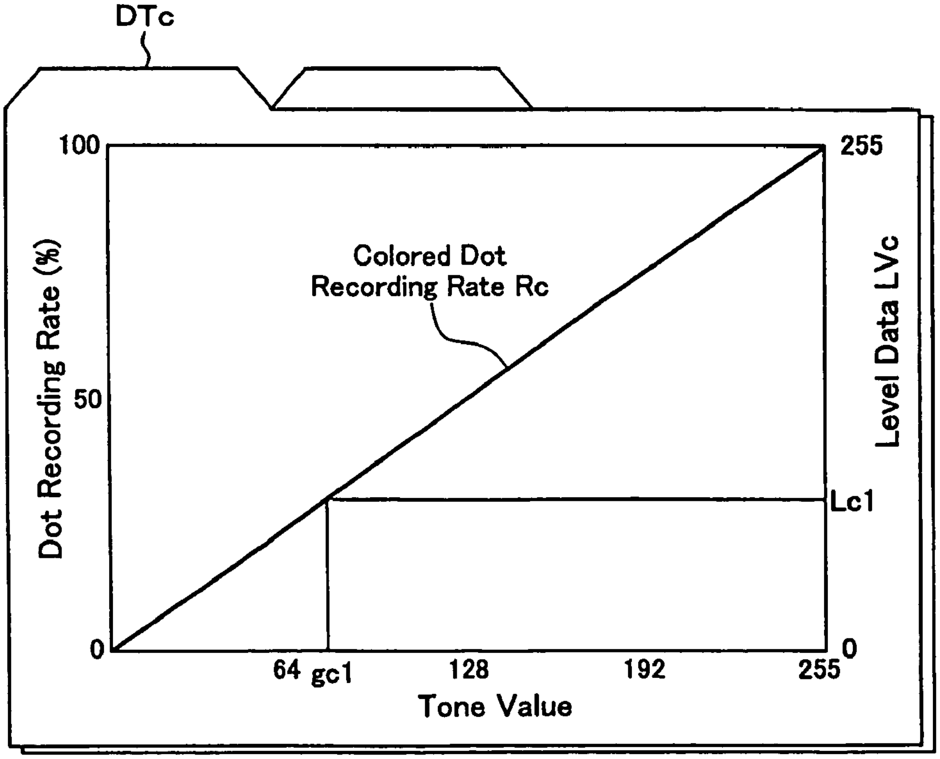

FIGS. 9(*a*), 9(*b*) are illustrations showing transparent dot recording rate table DTt and colored dot recording rate table DTc in this embodiment of the invention. FIG. 9(*a*) shows a transparent dot recording rate table DTt that stores transparent dot recording rate Rt. FIG. 9(B) shows a colored dot recording rate table DTc that stores colored dot recording rate Rc.

The horizontal axis of transparent dot recording rate table Dt gives tone value (0-15), the vertical axis at left gives dot recording rate (%); and the vertical axis at right gives level data (0-15). Level data refers to data consisting of transparent dot recording rate converted to 16 levels of 0-15. In the colored dot recording rate table Dtc, on the other hand, the horizontal axis gives tone value (0-255), the vertical axis at left gives dot recording rate (%); and the vertical axis at right gives level data (0-255).

The reason that transparent dot level data has 16 levels is because the quality-enhancing ink multi-tone data is established with 16 tones. By so doing, the amount of memory (not shown) needed to store the transparent dot recording rate table DTt can be reduced, and the data size needing to be processed is smaller so that processing speed can be faster.

In Step S220, tone-decreasing module 99 establishes level data LVt for transparent dots, while referring to the transparent dot recording rate table DTt. Regarding establishment of level data LVt, in the example shown in FIG. 9(*a*), for example, where the tone value of multi-tone data is gt1, transparent dot level data LVt can be calculated to be Lt1, using line Rt.

In Step S230, on the basis of the level data LVt established in Step S220, dot on/off state is determined by means of the systematic dither method. Specifically, dot on/off state is determined by comparing relative magnitude of level data LVL and a threshold value THL stored in the dither matrix. This threshold value THL has different values established on a pixel-by-pixel basis by means of a so-called dither matrix. In this embodiment, a dither matrix in which values of 0-14 appear in a 4×4 square pixel matrix is used.

Figure 10:
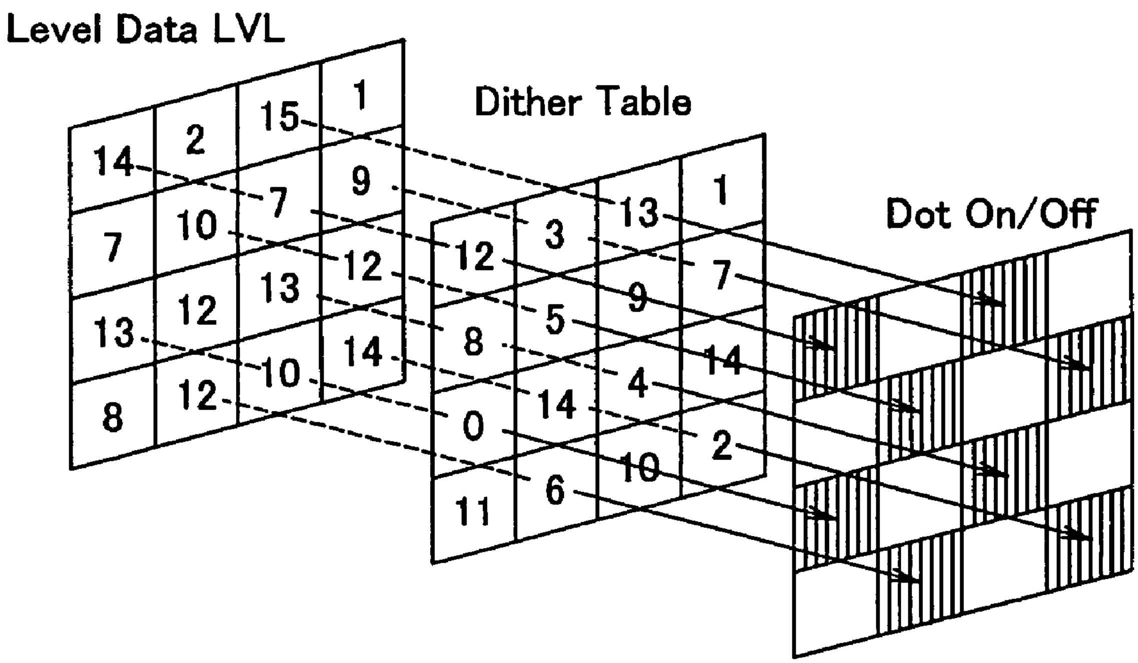
FIG. 10 is an illustration showing the concept of dot on/off state by the systematic dither method.

FIG. 10 is an illustration showing the concept of dot on/off state by the systematic dither method. As shown in FIG. 10, level data LVt consisting of pixel values of pixel blocks and threshold values THL at corresponding locations in the dither table are compared with regard to relative magnitude. In the event that level data LVt is greater than a threshold value THL in the dither table, dots will be formed on all print pixels belonging to this pixel block; in the event that level data LVt is smaller, no dots will be formed on any of the print pixels belonging to this pixel block. Pixel blocks indicated by hatching in FIG. 10 signify pixel blocks on which dots are formed.

Once the process described above for quality-enhancing ink has been carried out for all pixel blocks (Step S260), the process moves to Step S600 (FIG. 4). In Step S600, tone-decreasing module 99 carries out a tone-decreasing process on colored ink multi-tone data.

Figure 11:
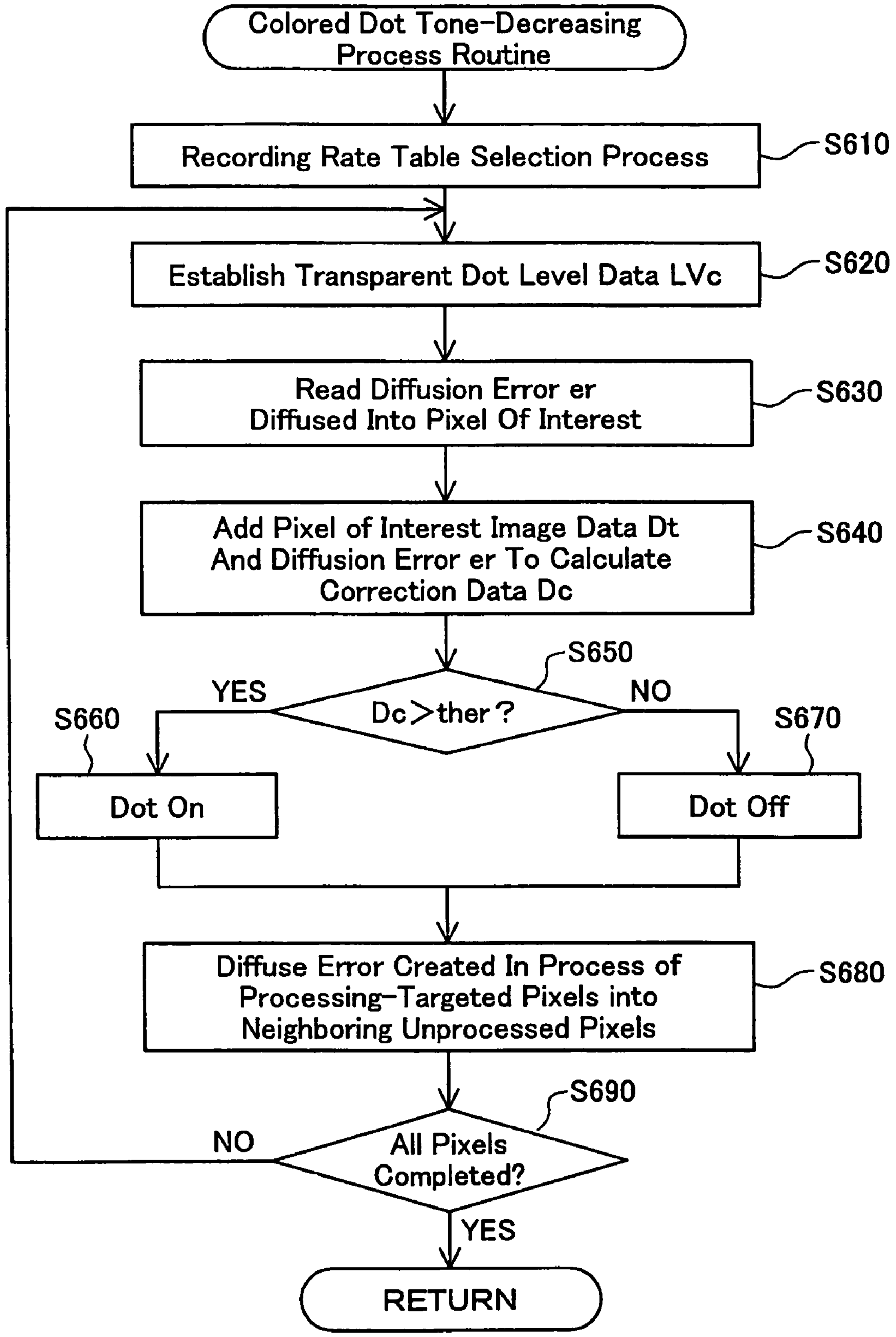
FIG. 11 is a flowchart showing the flow of the tone-decreasing process for multi-tone data of colored ink In this embodiment of the invention.

FIG. 11 is a flowchart showing the flow of the tone-decreasing process for multi-tone data of colored ink in this embodiment of the invention. This tone-decreasing process differs from the process for transparent ink in that the process is carried out by means of an error diffusion method in that the process is carried out by means of a systematic dither method. The reason that, for colored ink, the process is carried out by means of an error diffusion method is that since dispersion of colored dots has an appreciable effect on image quality, priority is given to image quality.

Figure 12:
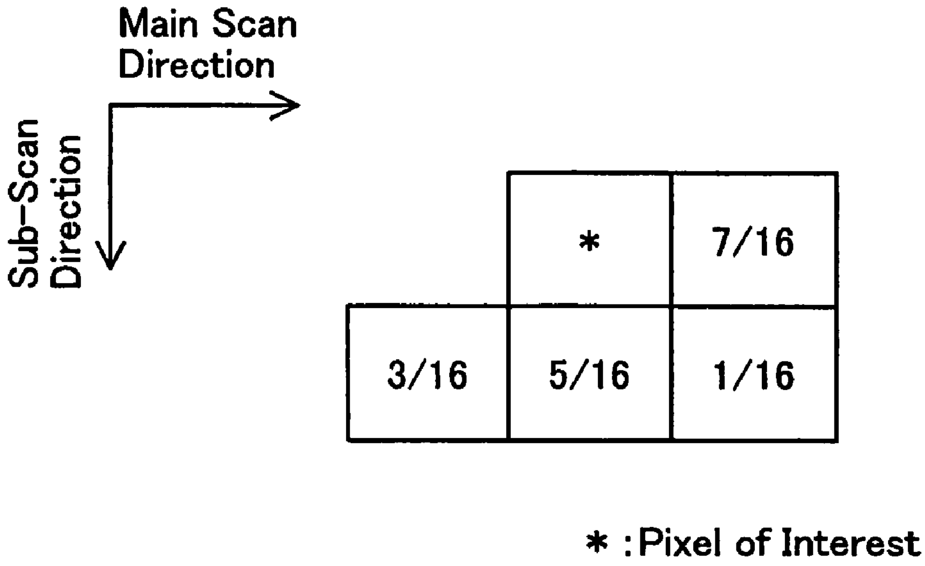
FIG. 12 is an illustration showing weighting coefficients for diffusing error into neighboring print pixels as an error diffusion method.

FIG. 12 is an illustration showing weighting coefficients for diffusing error into neighboring print pixels as an error diffusion method. In the example of FIG. 12, it is presumed that the pixel of interest shifts rightward in the main scanning direction. "Pixel of interest" is the print pixel currently targeted for the process of determining dot on/off state. In this embodiment, Floyd-Steinberg coefficients are used as the weight coefficients for error diffusion.

In Step S610, tone-decreasing module 99 selects the colored dot recording rate table DTc from among the two recording rate tables included in dot recording rate table DT.

In Step S620, tone-decreasing module 99 establishes colored dot level data LVc while referring to the colored dot recording rate table DTc. The method of establishing colored dot level data LVc is analogous to the method of establishing transparent dot level data LVt; for example, in the example shown in FIG. 9(*b*), where the tone value of multi-tone data is gc1, colored dot level data LVc can be calculated to be Lc1, using line Rc.

In Step S630, tone-decreasing module 99 reads diffusion error that has been diffused into the pixel of interest from a plurality of other, already processed print pixels. In Step S640, tone-decreasing module 99 reads the image data Dt for the pixel of interest, as well as adding the diffusion error er to the image data Dt that has been read, and creating correction data Dc. In this example, image data Dt is colored dot level data LVc.

In Step S650, tone-decreasing module 99 compares the correction data Dc with a pre-established threshold value Thre. In the event that, as a result, correction data Dc is greater than threshold value Thre, the determination is made to form a dot (Step S660). If on the other hand correction data Dc is less than threshold value Thre, the determination is made to not form a dot (Step S670).

In Step S680, tone-decreasing module 99 calculates tone error, as well as diffusing error into surrounding, unprocessed print pixels. Tone error represents the difference between correction data Dc and tone value produced by determination of dot on/off state. For example, where the tone value of correction data Dc is "223" and tone value produced by determination of dot on/off state is 255, tone error would be "−32" (=223−255).

Using error diffusion weighting coefficients (FIG. 12), tone error is diffused into surrounding, unprocessed print pixels. For example, for the print pixel adjacent to the right of the pixel of interest, error of "−14" ($=-32\times 7/16$) is diffused. Once the above process has been carried out for all colored inks for all print pixels (Step S690), the routine proceeds to Step S700 (FIG. 4).

In Step S700, the print data generating module 100 sorts the dot data representing dot formation status at pixels into the order in which it will be sent to the color printer 20, and outputs this as the final print data PD. Print data PD includes raster data indicating dot recording status during each main scan, and data indicating sub-scan feed distance.

In this way, in this embodiment, during the transparent dot data generating process, processing is carried out on block-by-block basis on pixel blocks which are groupings of print pixels, so the amount of data targeted for the transparent dot data generating process can be reduced. As a result, transparent dot data can be generated in a shorter processing time, and the amount of memory used in generating transparent dot data can be reduced.

Additionally, in this embodiment, multi-tone data is generated by a processing method arranged such that the tone number of quality-enhancing ink is smaller than the tone number of colored ink. By so doing, the amount of memory (not shown) needed to store the transparent dot recording rate table DTt can be reduced, and the amount of data processed is smaller so that the time needed for processing and memory can be accelerated.

Since a systematic dither method, which offers faster processing speed, is used to generate dot data for transparent dots, dot dispersion of which does not have an appreciable effect on image quality, there is the additional advantage that processing time can be accelerated further.

C. Variations:

The invention is not limited to the Embodiments and embodiments described hereinabove, and can be reduced to practice in various other forms without departing from the spirit of the invention. For example, the following variations are possible.

Figure 13:
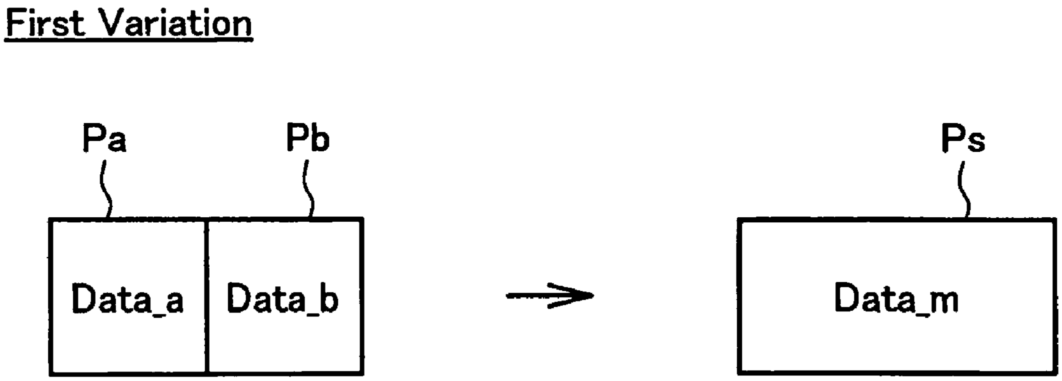
FIG. 13 is an illustration showing an example of a pixel block targeted for processing during generation of transparent dot data in a variation.

C-1. In this embodiment hereinabove, pixel blocks Ps are created by grouping together 2×2 arrays of four print pixels Pa, Pb, Pc, Pd; instead, pixel blocks could be created by grouping together a horizontal row of two print pixels Pa, Pb, as shown in FIG. 13. In this way, the number of print pixels included in the pixel blocks is not limited, an arrangement whereby processing-targeted pixels in the transparent dot generating process are equivalent to the grouping of print pixels would be acceptable.

Additionally, processing-targeted pixels in the transparent dot generating process need not necessarily correspond to print pixel groupings, and where the arrangement is such that size of pixels targeted for processing in the transparent dot data generating process is larger than size of pixels targeted for processing in the colored dot data generating process, processing speed can be accelerated. However, it should be noted that an advantage of an arrangement wherein processing-targeted pixels in the transparent dot generating process correspond to groupings of print pixels is that the burden of the conversion process from processing-targeted pixels to print pixels is minimal.

Further, an arrangement whereby processing-targeted pixels in the transparent dot generating process are larger than pixels targeted for processing in the colored dot data generating process from the beginning to the end of the generating process is also acceptable. An arrangement whereby processing-targeted pixel size in at least a portion of the process in the transparent dot data generating process is larger than processing-targeted pixel size in at least a portion of the process in the colored dot data generating process would also be acceptable.

C-2. In this embodiment hereinabove, the pixel value of a pixel block is the average value of the pixel values of print pixels belonging to the pixel block, but the pixel value of a pixel block could instead be the pixel value of a specific print pixel, or the smallest or largest value among pixel values of print pixels belonging to the pixel block. However, where the arrangement is one in which the pixel value of a specific print pixel is designated as the pixel value of the pixel block, the process becomes simpler, so that processing speed can be improved further.

"Specific print pixel" refers to any pixel designated in advance from among the print pixels belonging to a pixel block; in the example of FIG. 5 or FIG. 13, for example, pixel Pa may be so designated. Here, "specific print pixel" corresponds to the "specific pixel" recited in the claims.

C-3. In this embodiment hereinabove, using the error diffusion method and systematic dither method, a binarization process is carried out to determine whether or not to form colored dots and transparent dots, respectively, but for transparent dots, it would also be acceptable to reduce tone values using a density pattern method or other tone-decreasing process method with faster processing speed. Additionally, where the binarization process for colored dots is carried out by several methods, an arrangement whereby the tone-decreasing process for transparent dots is carried out, for example, using a processing method including the tone-decreasing process method with the shortest time required for execution, and at least not the "tone-decreasing process method with the longest time required for execution."

In this way, generally, the objects of the invention may be achieved even where transparent dot data is generated using a tone-decreasing process method with shorter time required for execution than the tone-decreasing process method used to generate at least some of the colored dot data.

C-4. In this embodiment hereinabove, there is described the example of an ink-jet printer equipped with piezo elements; however, the invention is applicable also to various printers and other printing devices, including printers of a type in which ink is ejected by means of bubbles formed in the ink by means of current passed through a heater.

C-4. The technique of the invention is not restricted to color printing but is also applicable to monochromatic printing. The technique is also applicable to a printing system that is capable of creating multiple dots in one pixel to express multiple tones.

C-5. In the respective embodiments discussed above, part of the hardware configuration may be replaced by the software, while part of the software configuration may be replaced by the hardware. For example, part or all of the functions of the printer driver 96 shown in FIG. 1 may be executed by the control circuit 40 included in the printer 20. In this modified structure, part or all of the functions of the computer 90 as the printing control apparatus of generating print data is attained by the control circuit 40 of the printer 20.

Part or all of the functions of the invention may be actualized by the software. In such cases, the software (computer programs) may be supplied in the form recorded in a computer readable recording medium. In the terminology of this invention, the 'computer readable recording medium' is not restricted to portable recording media like flexible disks and CD-ROMs but includes internal storage devices of the computer like various RAMs and ROMs and external storage devices fixed to the computer like hard disks.

Japanese Patent Application No. 2003-300722 (filed on Aug. 26, 2003) on the basis of the claim of priority of this application is incorporated herein by reference.

What is claimed is:

1. A printing control method of generating print data to be supplied to a print unit to print, the print unit forming dots on a print medium by ejecting ink droplets of at least one type of colored ink containing a color material and a quality-enhancing ink for enhancing quality of a printed material, the printing control method comprising:

(a) a color conversion step of converting pixel values representing a color in each pixel of the image data into multi-tone data of each ink, the multi-tone data of each ink being for expressing the color with the at least one colored ink and the quality-enhancing ink available in the print unit; and (b) a tone-decreasing step of generating dot data representing a dot formation state of a colored dot formed with the at least one colored ink and a transparent dot formed with the quality-enhancing ink in each pixel, according to the multi-tone data of the each ink generated by the color conversion, wherein the tone-decreasing step includes the step of generating transparent dot data by a process configured such that size of first processing-targeted pixels is larger than size of second processing-targeted pixels, the first processing-targeted pixels being targeted for processing in the transparent dot data generating process, the second processing-targeted pixels being targeted for processing in the colored dot data generating process, and wherein the first processing-targeted pixels correspond to groupings of the second processing-targeted pixels, and pixel values of the first processing-targeted pixels are determined according to pixel values of the second processing-targeted pixels belonging to the first processing-targeted pixels.

2. The printing control method according to claim 1, wherein pixel values of the first processing-targeted pixels are pixel values of a specific pixel among the second processing-targeted pixels belonging to the first processing-targeted pixels.

3. The printing control method according to claim 1, wherein the tone-decreasing step includes the step of generating transparent dot data using a tone-decreasing process method requiring shorter time for execution thereof than a tone-decreasing process method used to generate the colored dot data.

4. The printing control method according to claim 3, wherein the tone-decreasing step generates the colored dot data using an error diffusion method at least in part, and generates the transparent dot data using a systematic dither method.

5. The printing control method according to claim 3, wherein the tone-decreasing step generates the colored dot data using an error diffusion method at least in part, and generates the transparent dot data using a density pattern method.

6. A printing control apparatus for generating print data to be supplied to a print unit to print, the print unit forming dots on a print medium by ejecting ink droplets of at least one type of colored ink containing a color material and a quality-enhancing ink for enhancing quality of a printed material, the printing control apparatus comprising:

a color converter configured to convert pixel values representing a color in each pixel of the image data into multi-tone data of each ink, the multi-tone data of each ink being for expressing the color with the at least one colored ink and the quality-enhancing ink available in the print unit; and a tone-decreasing unit configured to generate dot data representing a dot formation state of a colored dot formed with the at least one colored ink and a transparent dot formed with the quality-enhancing ink in each pixel, according to the multi-tone data of the each ink generated by the color conversion, wherein the tone-decreasing unit is configured to generate transparent dot data by a process configured such that size of first processing-targeted pixels is larger than size of second processing-targeted pixels, the first processing-targeted pixels being targeted for processing in the transparent dot data generating process, the second processing-targeted pixels being targeted for processing in the colored dot data generating process, and wherein the first processing-targeted pixels correspond to groupings of the second processing-targeted pixels, and pixel values of the first processing-targeted pixels are determined according to pixel values of the second processing-targeted pixels belonging to the first processing-targeted pixels.

7. A printing apparatus for printing by forming dot on a print medium, the printing apparatus comprising:

a print unit configured to form dots on the print medium by ejecting ink droplets of at least one type of colored ink containing a color material and a quality-enhancing ink for enhancing quality of a printed material;

a color converter configured to convert pixel values representing a color in each pixel of the image data into multi-tone data of each ink, the multi-tone data of each ink being for expressing the color with the at least one colored ink and the quality-enhancing ink available in the print unit; and a tone-decreasing unit configured to generate dot data representing a dot formation state of a colored dot formed with the at least one colored ink and a transparent dot formed with the quality-enhancing ink in each pixel, according to the multi-tone data of the each ink generated by the color conversion, wherein the tone-decreasing unit is configured to generate transparent dot data by a process configured such that size of first processing-targeted pixels is larger than size of second processing-targeted pixels, the first processing-targeted pixels being targeted for processing in the transparent dot data generating process, the second processing-targeted pixels being targeted for processing in the colored dot data generating process, and wherein the first processing-targeted pixels correspond to groupings of the second processing-targeted pixels, and pixel values of the first processing-targeted pixels are determined according to pixel values of the second processing-targeted pixels belonging to the first processing-targeted pixels.

8. A computer program product for causing a computer to generate print data to be supplied to a print unit to print, the print unit forming dots on a print medium by ejecting ink droplets of at least one type of colored ink containing a color material and a quality-enhancing ink for enhancing quality of a printed material, wherein, the computer program product comprising:

a computer readable medium; and a computer program stored on the computer readable medium, the computer program comprising:

a first program for causing the computer to convert pixel values representing a color in each pixel of the image data into multi-tone data of each ink, the multi-tone data of each ink being for expressing the color with the at least one colored ink and the quality-enhancing ink available in the print unit; and a second program for causing the computer to generate dot data representing a dot formation state of a colored dot formed with the at least one colored ink and a transparent dot formed with the quality-enhancing ink in each pixel, according to the multi-tone data of the each ink generated by the color conversion, wherein the first program includes a program for causing the computer to generate transparent dot data by a process configured such that size of first processing-targeted pixels is larger than size of second processing-targeted pixels, the first processing-targeted pixels being targeted for processing in the transparent dot data generating process, the second processing-targeted pixels being targeted for processing in the colored dot data generating process, and wherein the first processing-targeted pixels correspond to groupings of the second processing-targeted pixels, and pixel values of the first processing-targeted pixels are determined according to pixel values of the second processing-targeted pixels belonging to the first processing-targeted pixels.

* * * * *